United States Patent
Livne et al.

(10) Patent No.: US 8,849,243 B2
(45) Date of Patent: Sep. 30, 2014

(54) SYSTEM AND METHOD FOR UNIFIED CHARGING OVER IN AND IMS NETWORKS FOR SCIM / SERVICE BROKER

(75) Inventors: Shlomo Livne, Ra'anana (IL); Dima Polsky, Jerusalem (IL); Vladimir Furman, Giv'at Ada (IL); Renana Seidman, Ra'anana (IL); Marina Bunin, Netanya (IL); Avi Zohary, Rosh Haayin (IL); Yoel Amram, Rechovo (IL); Amnon Heiman, Tel Aviv (IL); Nadav Kadosh, Giv'atayim (IL); Tzach Livyatan, Tel Aviv (IL)

(73) Assignee: Oracle International Corporation, Redwood Shores, CA (US)

( * ) Notice: Subject to any disclaimer, the term of this patent is extended or adjusted under 35 U.S.C. 154(b) by 27 days.

(21) Appl. No.: 13/610,625

(22) Filed: Sep. 11, 2012

(65) Prior Publication Data

US 2014/0073284 A1  Mar. 13, 2014

(51) Int. Cl.
  *H04W 4/24*  (2009.01)
(52) U.S. Cl.
  USPC ........................................ 455/406; 455/405

(58) Field of Classification Search
  CPC .......... H04W 4/24; H04W 4/26; H04M 17/00
  USPC ................... 455/405, 406, 426.1, 432.1, 433; 370/401, 466
  See application file for complete search history.

(56) References Cited

U.S. PATENT DOCUMENTS

2005/0014483 A1\* 1/2005 Lagerstrom ................... 455/405

\* cited by examiner

*Primary Examiner* — Sam Bhattacharya
(74) *Attorney, Agent, or Firm* — Meyer IP Law Group

(57) ABSTRACT

In accordance with various embodiments, systems and methods that provide unified charging across different network interfaces are provided. A system can include an online charging system, executing on one or more microprocessors, a SCIM, which is operable to manage communication between a plurality of subscribers over a plurality of different network interfaces, and a set of interworking charging modules that use a unified charging structure to provide mappings between network protocol parameters and capabilities. The interworking charging modules can be configured to provide a same charging behavior to a plurality of different network protocols.

23 Claims, 14 Drawing Sheets

SYSTEM AND METHOD FOR UNIFIED CHARGING OVER IN AND IMS NETWORKS FOR SCIM / SERVICE BROKER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to charging in telecommunications networks and in particular to a system and method for unified charging over IN and IMS networks for SCIM/service broker.

BACKGROUND

In the IP Multimedia Subsystem (IMS) architecture, the Ro interface is used to connect network elements to online charging systems (OCS). The 3rd Generation Partnership Project (3GPP) standards body for GSM networks has extended this and defined both CAP and Ro as the interfaces into the OCS. The 3rd Generation Partnership Project 2 (3GPP2) standards body for CDMA networks has defined Ro as the interface not providing a solution for its IN networks. Today, many OCS systems support the Ro interface and do not support the CAP interface. To close this gap Online Mediation solutions are used to mediate between Ro and CAP, Ro and WIN2.

Today, there is no standard approach to implement this mediation, and, thus, solutions tend to be limited and are not cohesive and consistent across different network interfaces.

Over the last five years, operator and network consolidation has become more common. This consolidation has left many operators in a situation in which they have an OCS which supports Ro and multiple network protocols including Ro, Camel (CAP2, CAP3, CAP4), WIN2, SIP/ISC, etc. The problem of not having a cohesive and consistent mediation solution across all of a particular operator's network interfaces introduces cases in which different subscribers in the same network each receive a different user experience.

SUMMARY

In accordance with various embodiments, systems and methods that provide unified charging across different network interfaces are provided. A system can include an online charging system, executing on one or more microprocessors, a SCIM, which is operable to manage communication between a plurality of subscribers over a plurality of different network interfaces, and a set of Interworking Charging Modules that mediate between the network interfaces to a unified charging structure which provides mappings between network protocol parameters and network capabilities. The interworking charging module can be configured to provide the same charging behavior to a plurality of different network protocols.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, systems and methods that provide unified charging across different network interfaces are provided. A system can include an online charging system, executing on one or more microprocessors, a SCIM, which is operable to manage communication between a plurality of subscribers on a plurality of different network interface, and a set of interworking charging modules that use a unified charging structure which provides mappings between network protocol parameters and network capabilities. The interworking charging modules can be configured to provide a same charging behavior to a plurality of different network protocols.

Embodiments of the present invention enable an operator to ensure that their existing subscribers will be provided with a unified charging experience. Additionally, the operator can ensure that a subscriber that is using different means to communicate over the network (IMS-SIP/IMS-RO CAMEL/WIN) will have the same charging experience. This is beneficial as operators are crossing the boundaries of fixed/mobile/internet/tv—and a single subscriber is using more than one medium. Further, this solution provides extensibility such that if that operator's network changes, the present invention can be extended to accommodate the network changes, and continue to provide subscribers with the same user experience.

Figure 1:
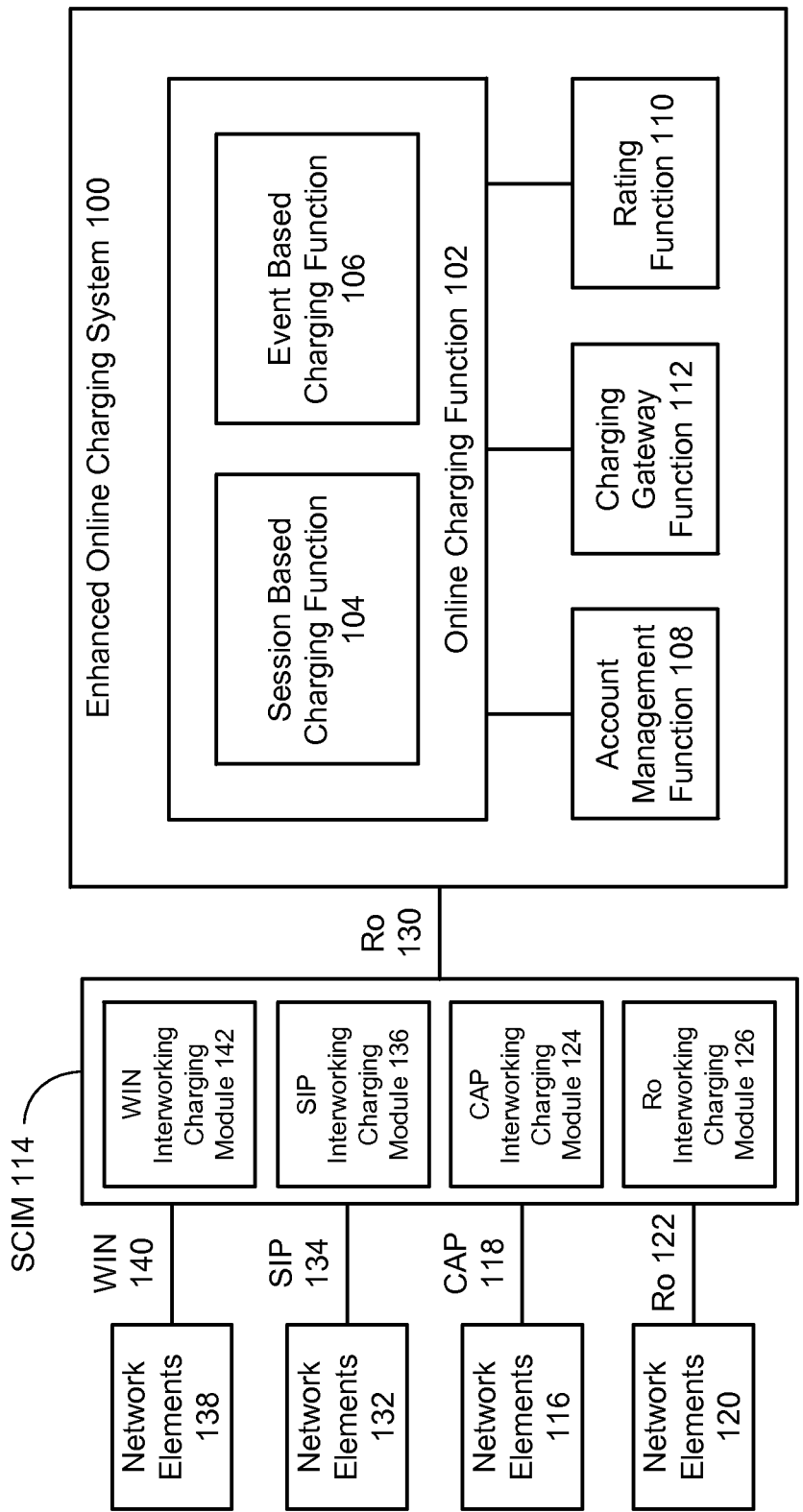
FIG. 1 shows an enhanced online charging system (OCS), in accordance with an embodiment of the invention.

FIG. 1 shows an online charging system (OCS), that is connected to a SCIM to provide a unified charging experience in accordance with an embodiment of the invention. The OCS 100 can include an online charging function (OCF) 102 which is configured to provide a session based charging function 104 and an event based charging function 106. The OCF can interface with an account balance, management function 108 which can be used to access and/or update a particular user's account, and a rating function 110, which can be used to, among other features, determine the price of chargeable events. Additionally, the OCF can interface with a charging gateway function 112 which can send charging information to the network operator's post processing system. The SCIM (114) is connecting to the OCS over an Ro comparable (130) interface.

As noted above, in traditional systems, the problem of not having a cohesive and consistent mediation solution across all of a particular operator's network interfaces introduces cases in which different subscribers in the same network receive a different user experience. In accordance with an embodiment of the invention, this problem is addressed using SCIM 114 which includes interworking charging modules that can provide a common experience for CAP network elements 116 connecting using CAP 118 via a CAP interworking charging module 124, RO network elements 120 connecting using Ro via a Ro interworking charging module 122, SIP network elements 132 via a SIP Interworking charging module 136 and WIN network elements 138 using WIN 140 connecting via a WIN inteorking charging module 142. The SCIM 114 interworking charging modules can provide a unified charging experience for a variety of session control network types (e.g., CAP2, CAP3, CAP4, WIN2, Ro, SIP/ISC). The support is provided both to networks that support monitoring on the protocol level (e.g., networks in which there are messages/commands that allow applications to request usage monitoring from the network), referred to below as External. For example, these networks can include CAP2, CAP3, CAP4—using ApplyCharging/ApplyChargingReport messages, and Ro—using CCR/CCA messages. Additionally, support is also provided for networks that do not provide such control WIN2, SIP/ISC via internal processing (referred to below as Internal).

Table 1, below, summarizes the support that is provided by the enhanced OCS:

TABLE 1

|  | INAP CS1 | CAP1 | CAP2 | CAP3 | CAP4 | WIN | RO | SIP |
|---|---|---|---|---|---|---|---|---|
| Internal | X | X | X | X | X | X |  | X |
| External |  |  | X | X | X |  | X |  |

As shown in Table 1, both internal and external support is provided for CAP2, CAP3 and CAP4; only internal support is provided for WIN and SIP; and only external support is provided for Ro.

In accordance with an embodiment of the invention, the interworking charging modules use a unified charging structure that is based on the Ro Charging structure. The Internal implementation can use internal timers that are set according to the Ro structure. In the external implementation, mappings are provided between the unified charging structure to Ro parameters and to CAMEL parameters.

External and Internal charging enable the configuration of when balance check should be done, e.g., on call initiation or on call answer, and the configuration of when call charging should start, e.g., on call initiation or on call answer. Such flexibility is advantageous as different countries, and sometimes different operators, apply different regulations or rules on when charging should start.

FIGS. 2-4 each show four flows, as described below in Table 2, for IMS, CDMA (WIN) and GSM (CAP) networks, respectively.

TABLE 2

| Flow Number | Check Balance | Start Charging | Account State |
|---|---|---|---|
| Flow A | Initiation | Initiation | Has Credits |
| Flow B | Initiation | Answer | Has Credits |
| Flow C | Answer | Answer | Has Credits |
| Flow D | Answer | Answer | No Credits |

Figure 2A:
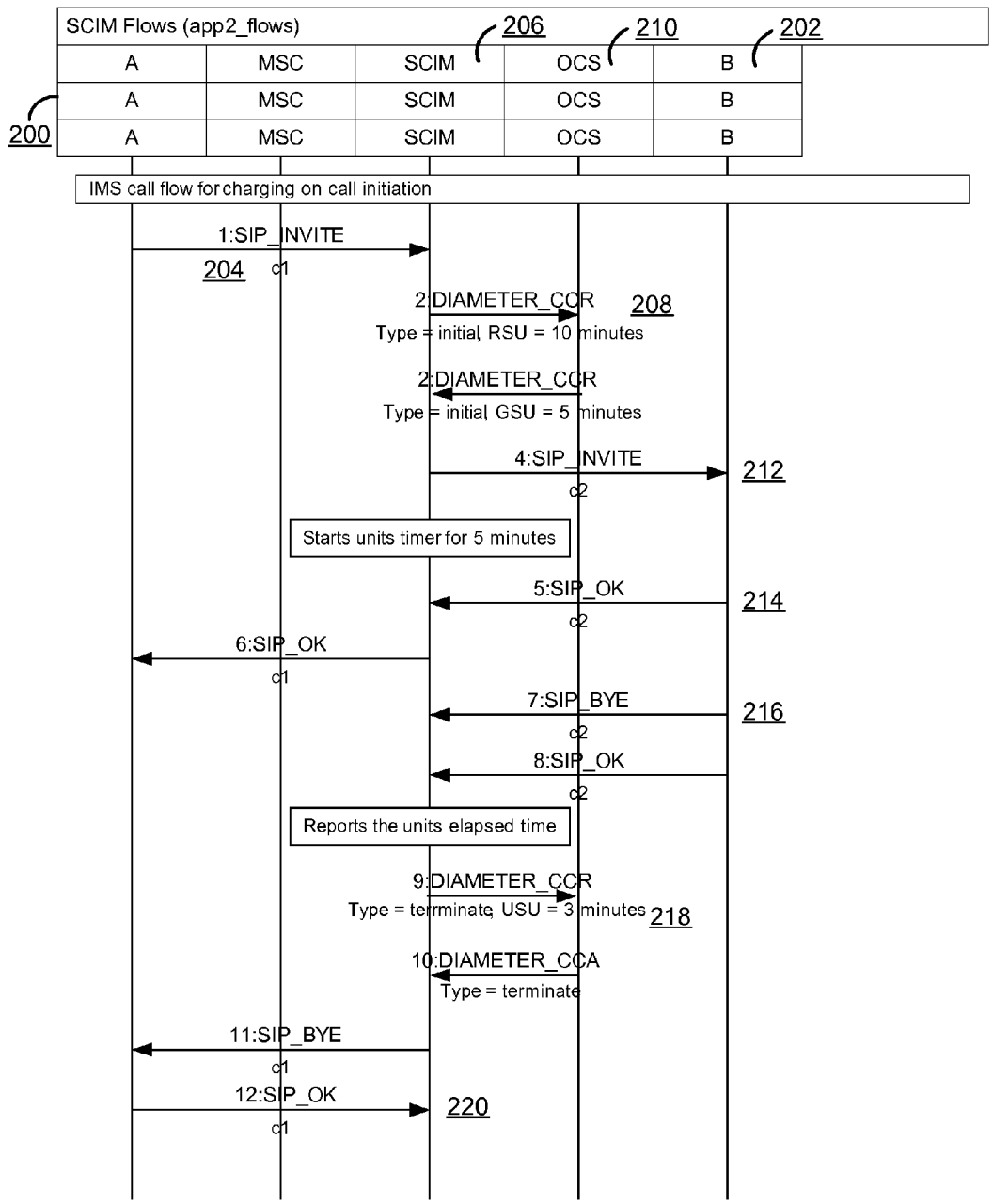
FIGS. 2A-2D show sequence diagrams of unified charging in an IMS network, in accordance with an embodiment of the invention.

FIGS. 2A-2D show sequence diagrams of unified charging in an IMS network, in accordance with an embodiment of the invention. FIG. 2A shows a sequence diagram in which the subscriber's balance is checked, and charging begins, when a call is initiated (i.e., when the subscriber dials, before the call is answered). As shown in FIG. 2A, when subscriber A 200 calls a second subscriber B 202, an INVITE message 204 is sent to SCIM 206. The SCIM 206 checks subscriber A's balance by sending a request 208 to OCS 210. In this example, OCS 210 initially allocates five minutes to subscriber A. The SCIM 206 then sends an INVITE message 212 to subscriber B 202 and a timer is started for five minutes. At 214 the call is answered by subscriber B 202. At 216, subscriber B ends the call. The SCIM 206 can then report 218 the elapsed time of the call to OCS 210. At 220, the connection to subscriber A is closed.

Figure 2B:
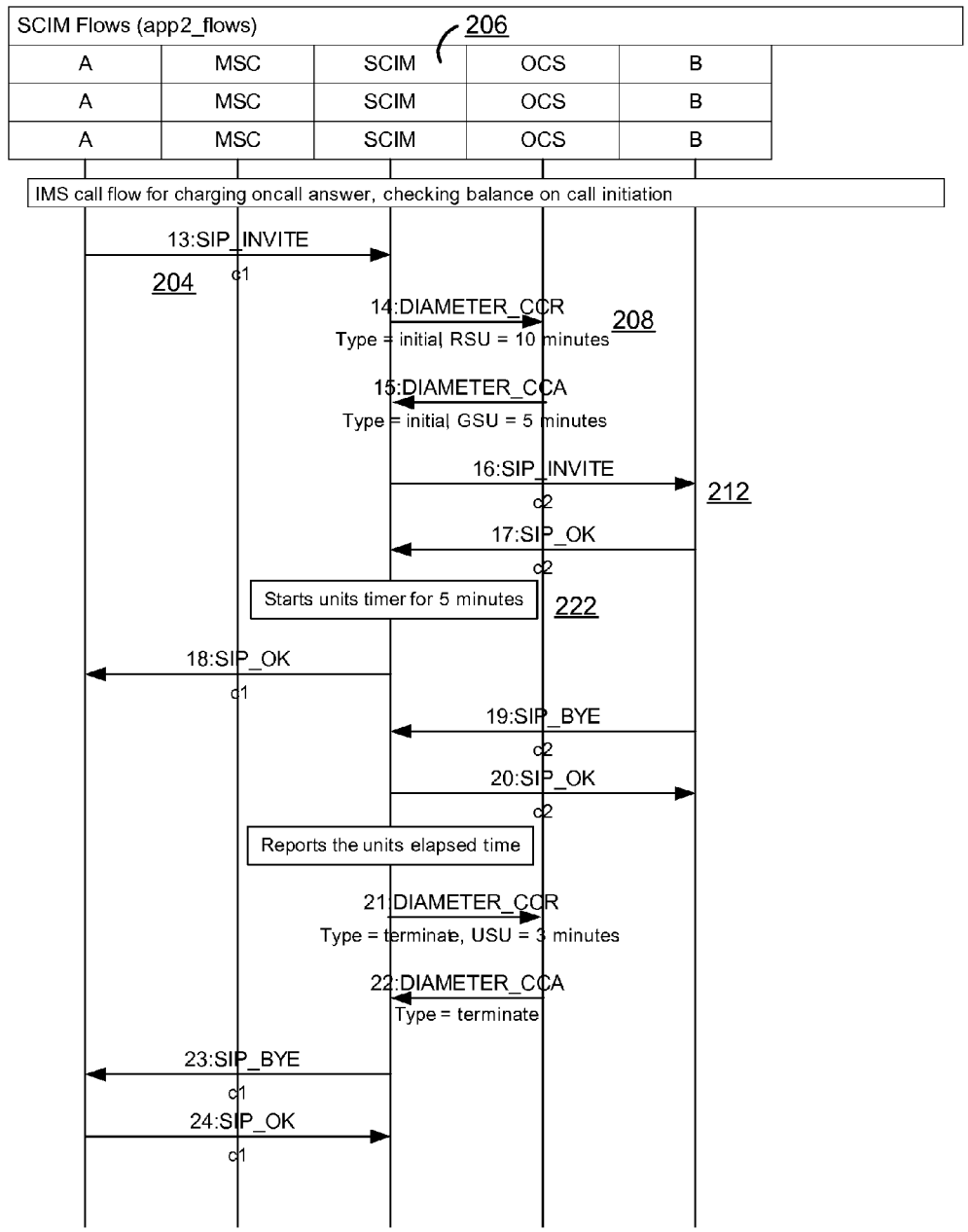

FIG. 2B shows a similar sequence diagram to FIG. 2A, however in this example charging does not begin until subscriber B answers the call. In FIG. 2B, processing begins as in FIG. 2A with an INVITE message 204 sent to the SCIM 206 and a balance check 208. An INVITE message is then sent to subscriber B 212, but charging does not begin until after the answer 222. Processing then continues substantially similarly as shown in FIG. 2A.

Figure 2C:
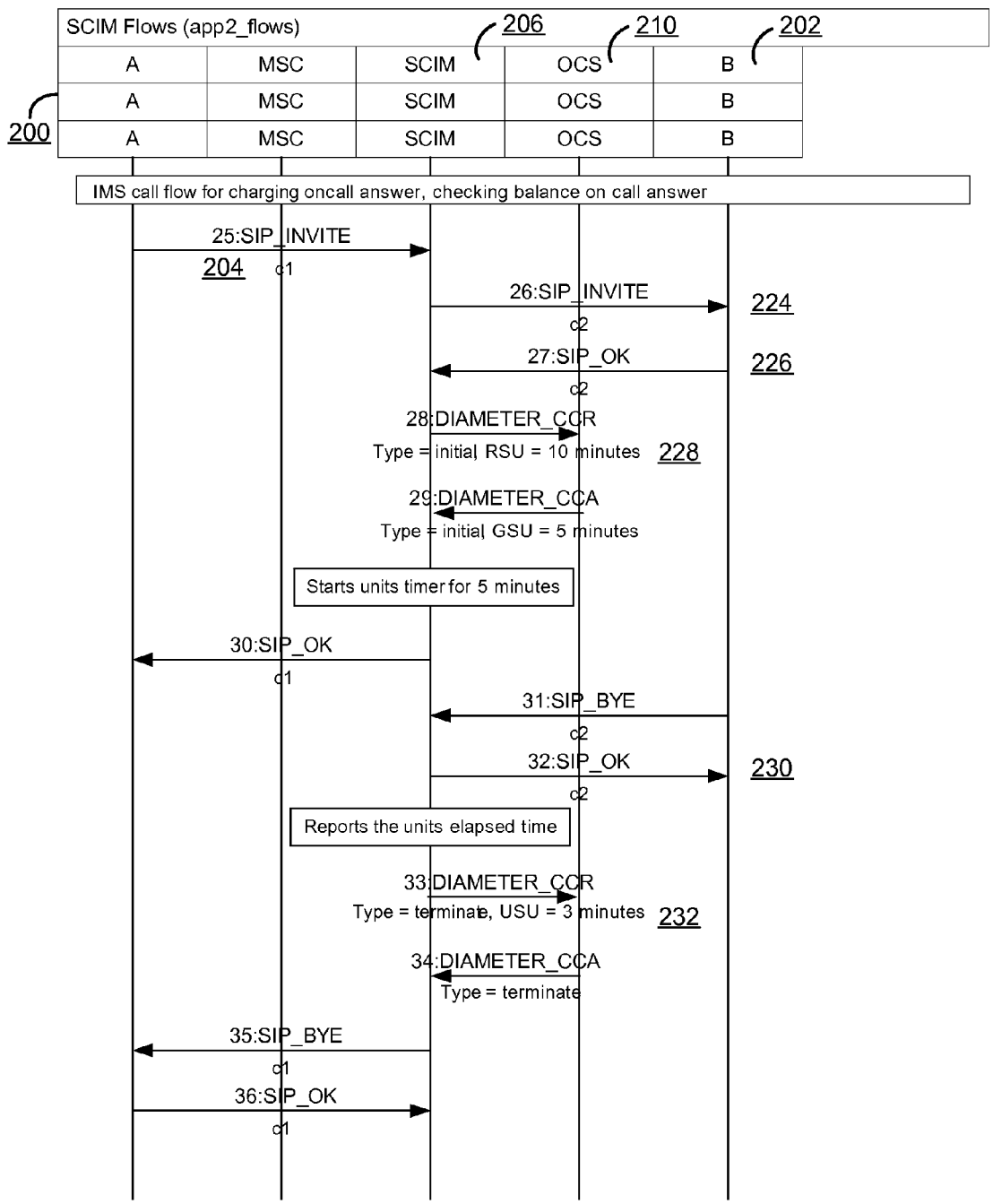

FIG. 2C shows a similar sequence diagram to FIGS. 2A and 2B except that both check balance and charging occur when the call is answered. In networks where a large number of calls are made, but few calls are actually answered, checking balances prior to the answer can create a large processing overhead. By waiting to check the subscriber's balance until the call is answered, this overhead is reduced. In this example, when subscriber A 200 calls subscriber B 202 an INVITE message 204 is sent to SCIM 206. The SCIM then sends an INVITE message 224 to subscriber B without performing a balance check. After the call is answered 226 a balance check 228 is performed and charging begins. When the call ends 230 the elapsed time will be reported 232 and deducted from the subscriber's account.

Figure 2D:
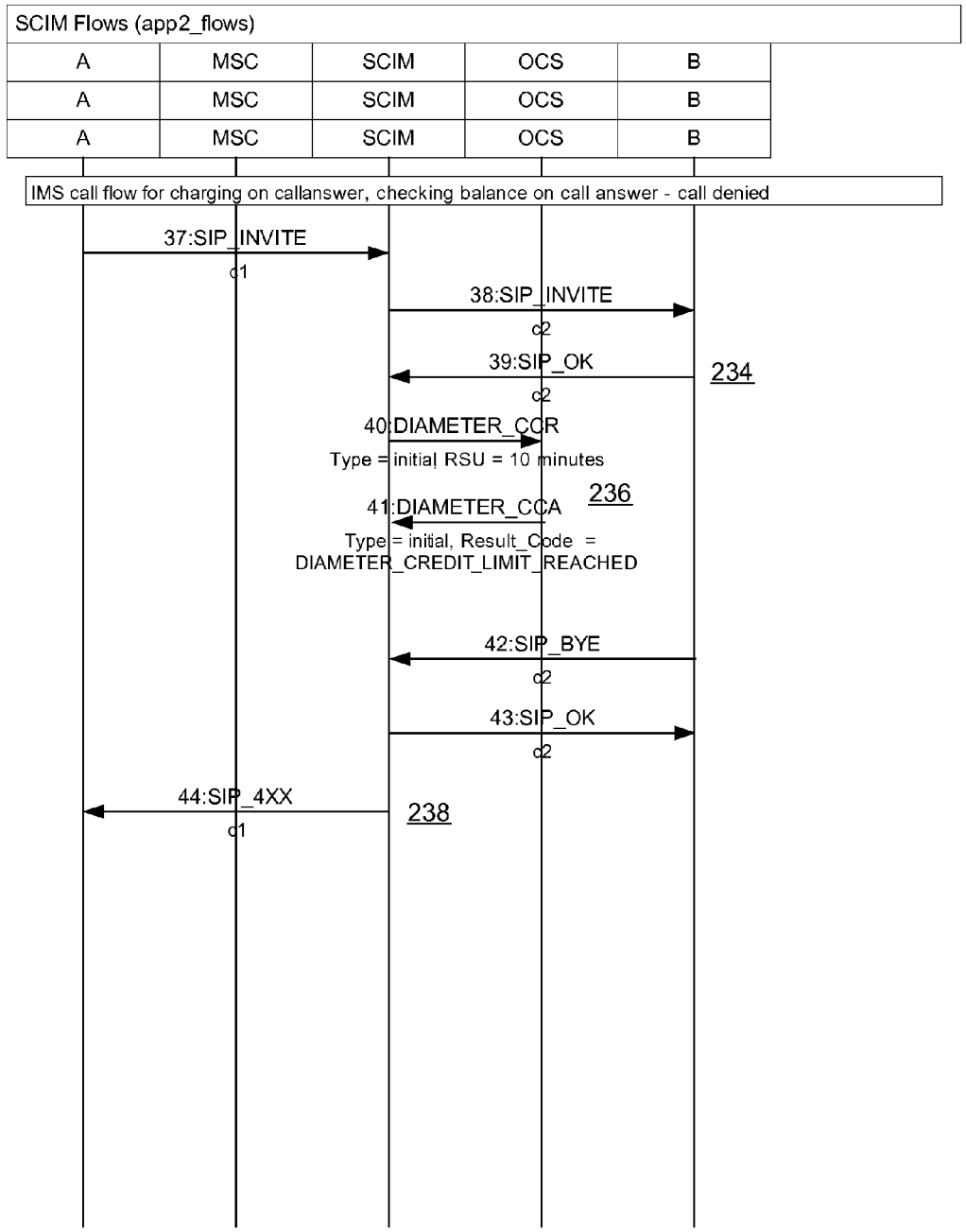

FIG. 2D shows a similar sequence diagram to FIG. 2C except the balance check fails. As shown in FIG. 2D, after the call is answered at 234, the balance check 236 indicates that the subscriber's credit limit has been reached. The answered call is then disconnected 238. Although the scenario shown in FIGS. 2C and 2D reduces overhead (in this case, unnecessary balance checks) it does produce a less preferred user experience by disconnecting answered calls due to insufficient balance.

Figure 3A:
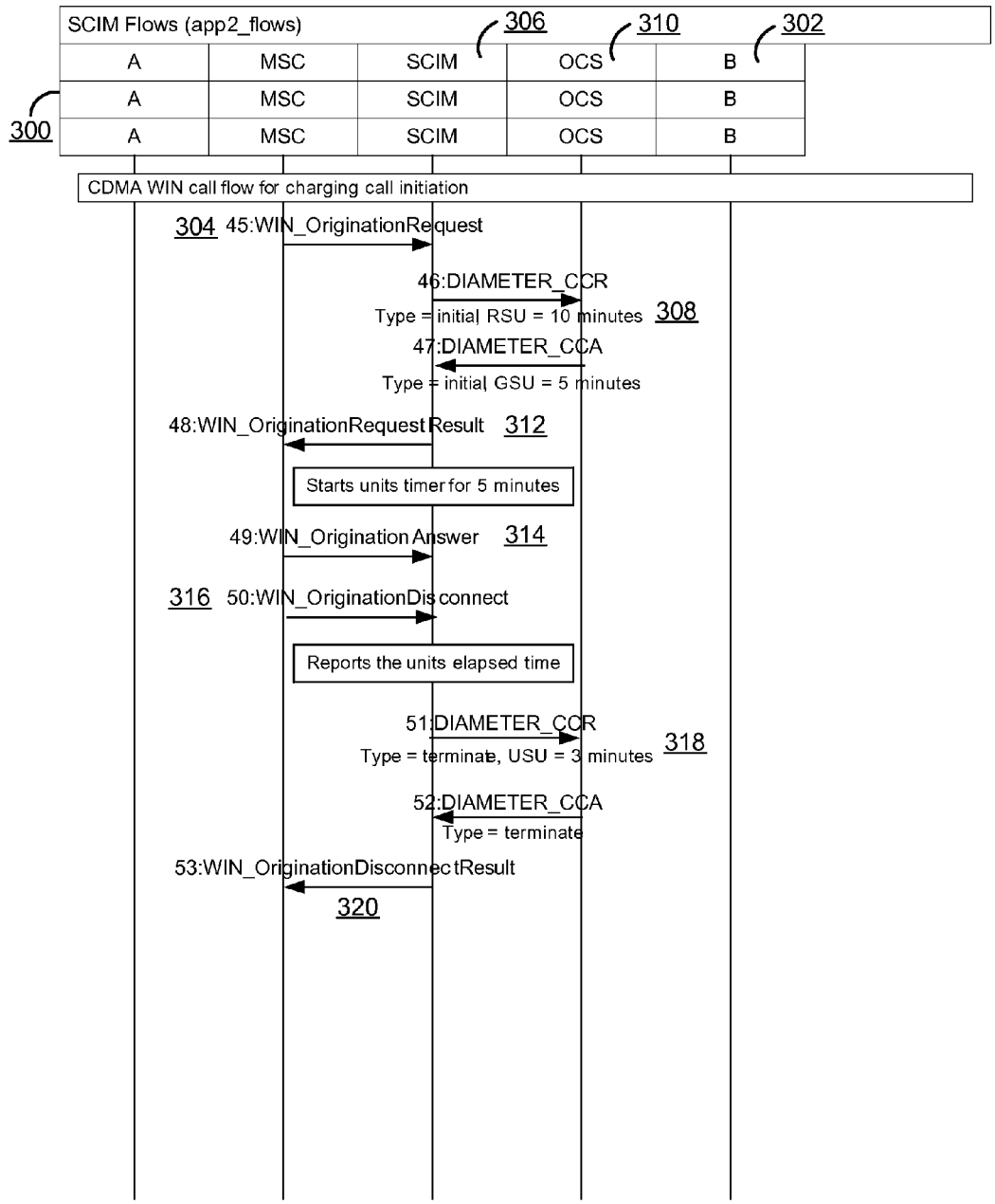
FIGS. 3A-3D show sequence diagrams of unified charging in a CDMA (WIN) network, in accordance with an embodiment of the invention.

FIGS. 3A-3D show sequence diagrams of unified charging in a CDMA (WIN) network, in accordance with an embodiment of the invention. As described above with respect to FIG. 2A, FIG. 3A shows a sequence diagram in which the subscriber's balance is checked, and charging begins, when a call is initiated. As shown in FIG. 3A, when subscriber A 300 calls a second subscriber B 302, an OriginationRequest 304 is sent to SCIM 306. The SCIM 306 checks subscriber A's balance by sending a request 308 to OCS 310; the OCS then allocates five minutes for the call. At 312, an OriginationRequestResult is sent indicating the call can continue. At this point, charging begins and a timer is started prior to the answer at 314. At 316 the call ends and the elapsed time of the call is reported 318 to OCS 310. At 320, the connection to subscriber A is closed.

Figure 3B:
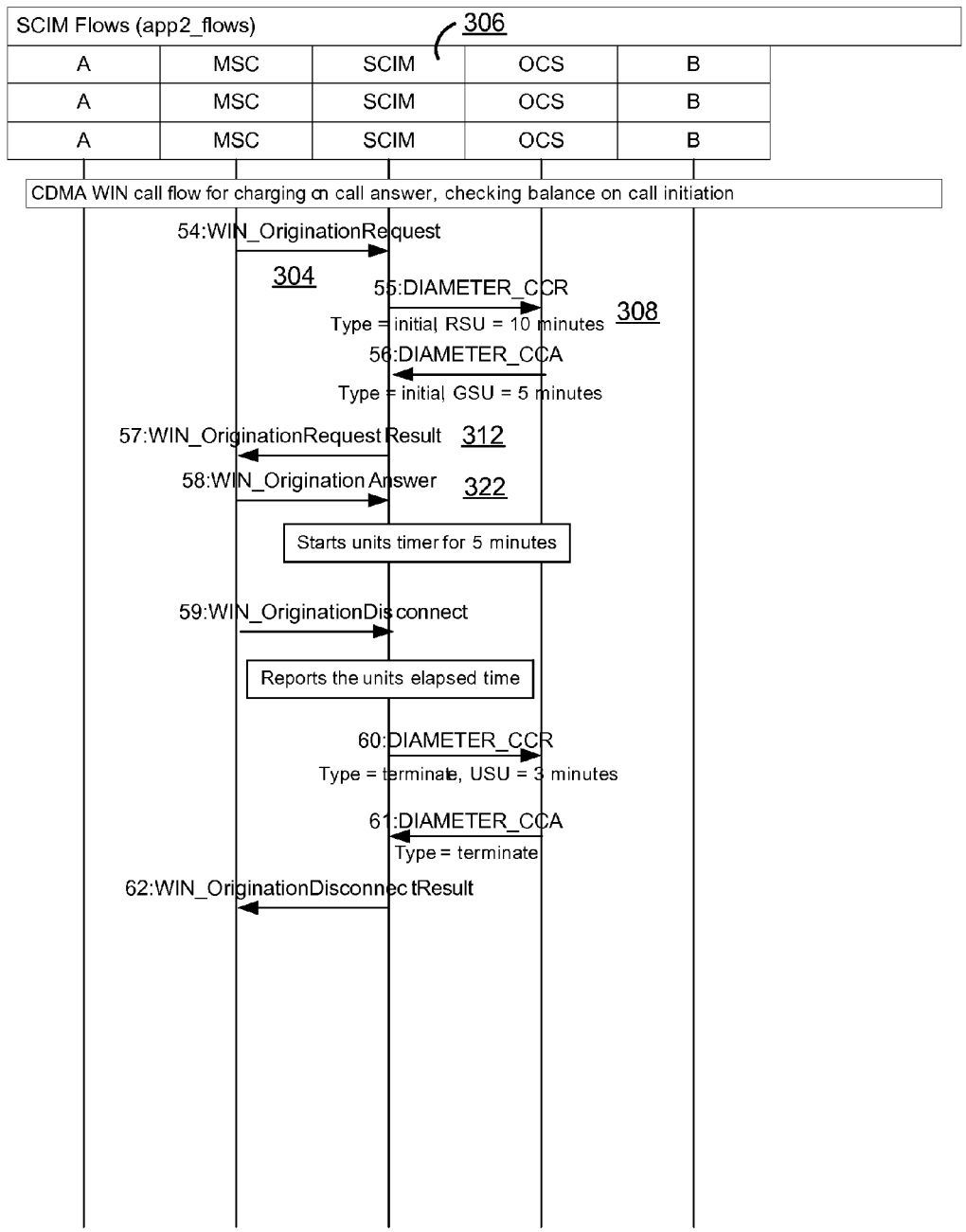

FIG. 3B shows a sequence diagram in which charging does not begin until subscriber B answers the call. In FIG. 3B, processing begins as in FIG. 3A with an OriginationRequest 304 sent to the SCIM 306 and a balance check 308. The call is initiated at 312, but charging does not begin until after the call is answered at 322. Processing then continues substantially similarly as shown in FIG. 3A.

Figure 3C:
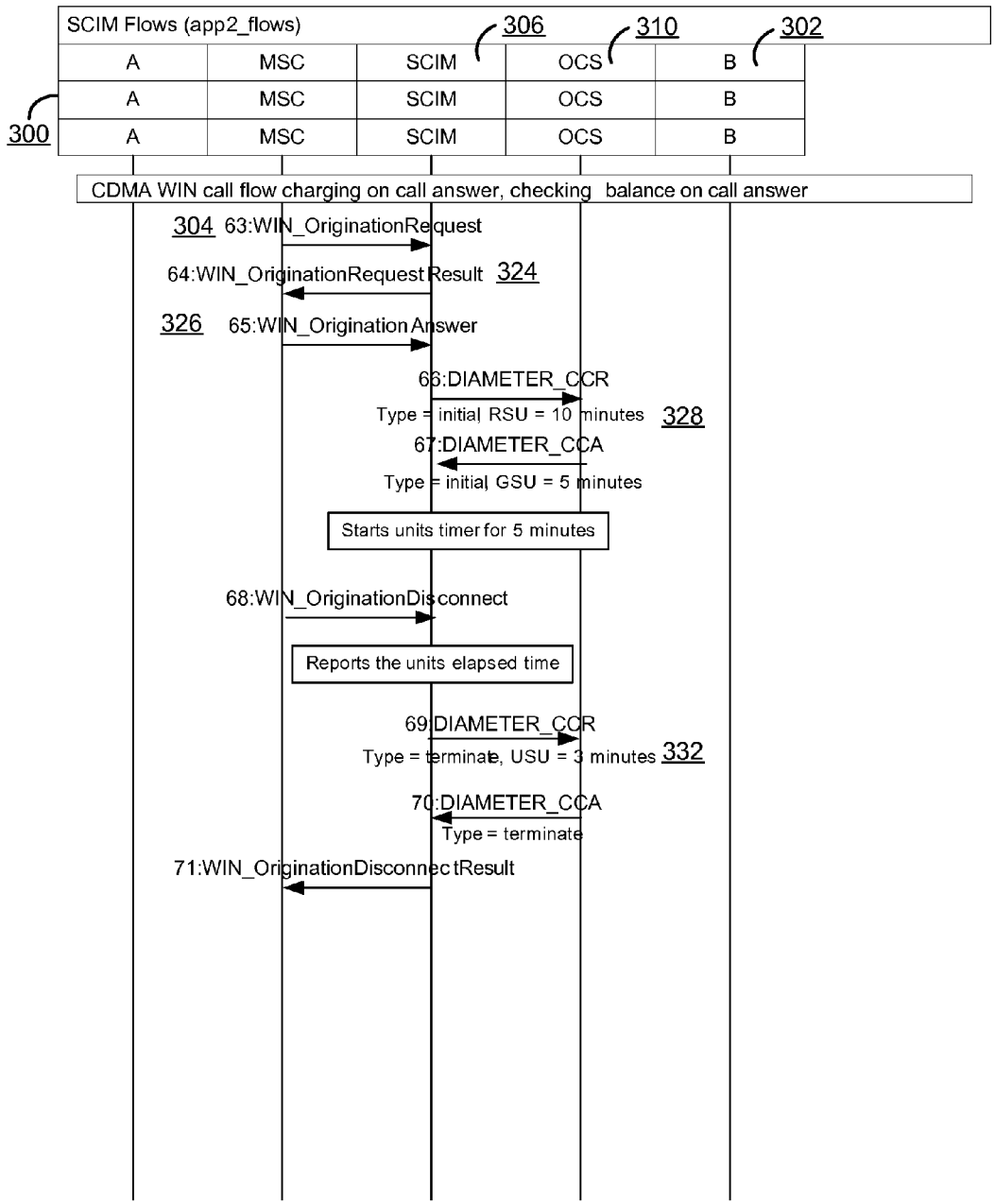

FIG. 3C shows a sequence diagram in which both check balance and charging occur when the call is answered. As shown in FIG. 3C, when subscriber A 300 calls subscriber B 302, an OriginationRequest 304 is sent to SCIM 306. The call is then initiated 324 with subscriber B without performing a balance check. After the call is answered 326, a balance check 328 is performed, a timer is set and charging begins. When the call ends 330, the elapsed time will be reported 332 and deducted from the subscriber's account.

Figure 3D:
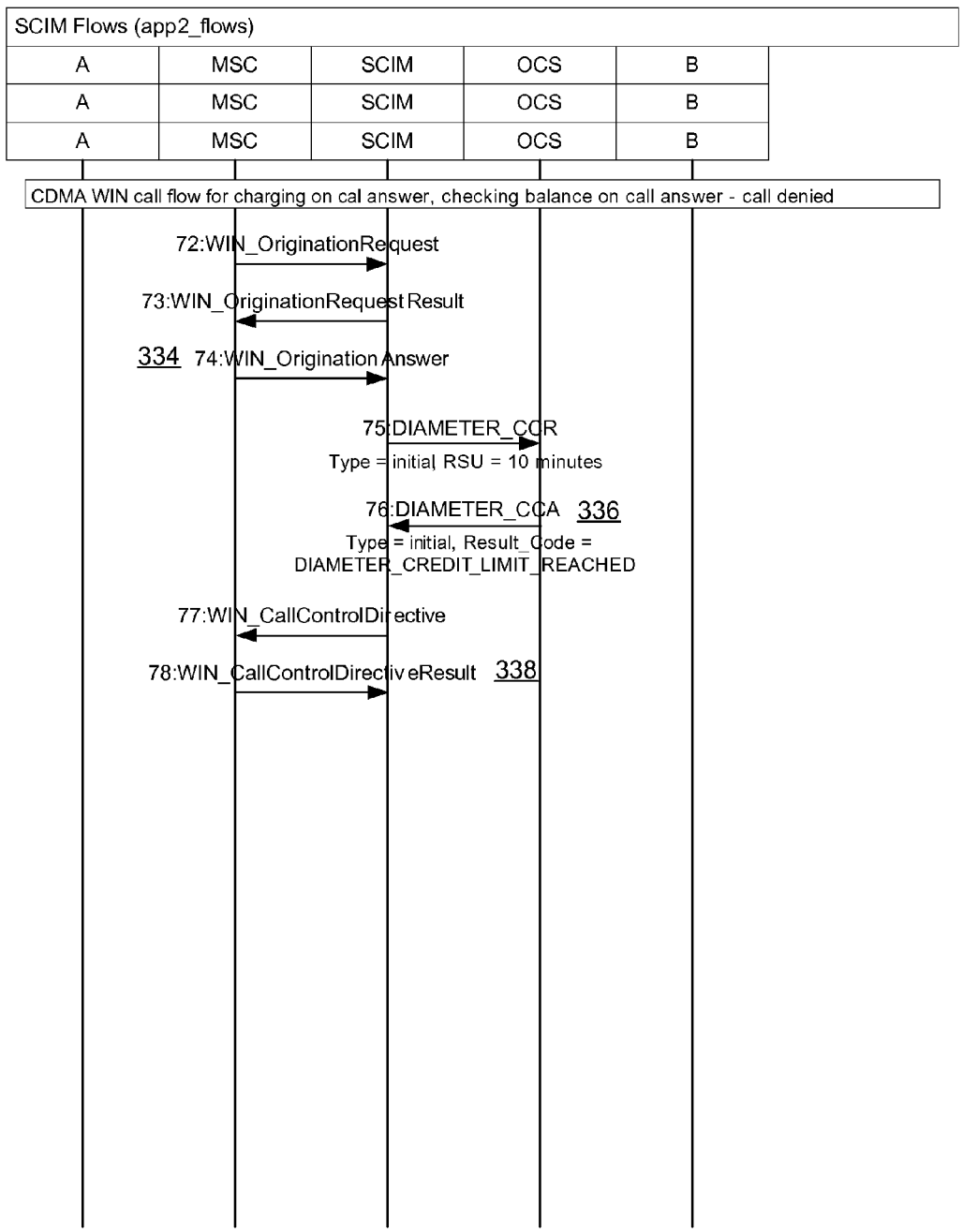
Figure 4A:
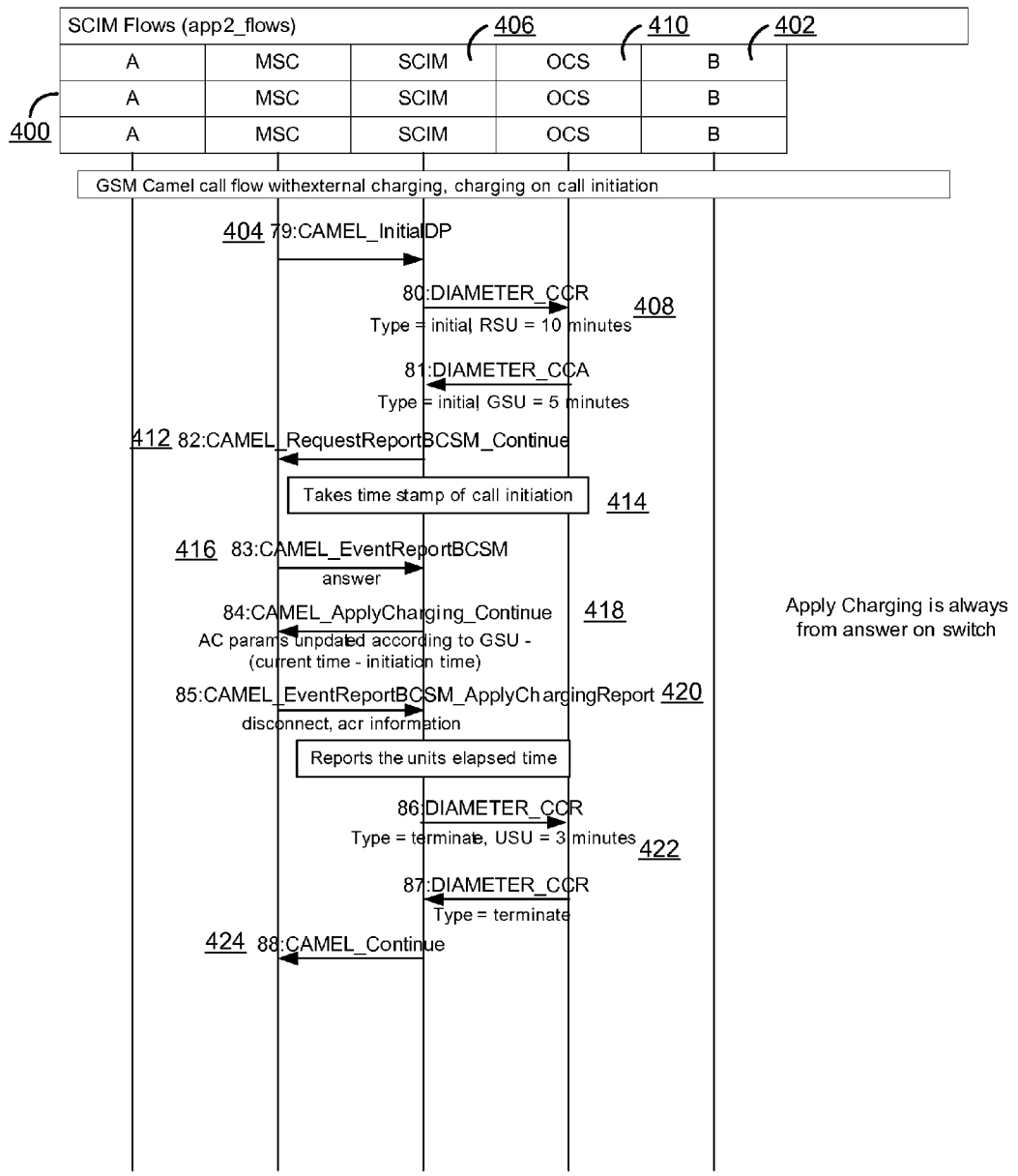
FIGS. 4A-4D show sequence diagrams of unified charging in a GSM network, in accordance with an embodiment of the invention.

FIG. 3D shows a similar sequence diagram to FIG. 3C except the balance check fails. As shown in FIG. 3D, after the call is answered at 334, the balance check 336 indicates that the subscriber's credit limit has been reached. A CallControl-Directive (CCDIR) 338 is then used to force the call to disconnect FIGS. 4A-4D show sequence diagrams of unified charging in a GSM network, in accordance with an embodiment of the invention. As described above with respect to FIGS. 2A and 3A, FIG. 4A shows a sequence diagram in which the subscriber's balance is checked, and charging begins, when a call is initiated. However, because this shows the flow within a GSM network, charging can be performed externally by a network switch. As shown in FIG. 4A, when subscriber A 400 calls subscriber B 402, an InitialDP 404 is sent to SCIM 406. The SCIM 406 checks subscriber A's balance by sending a request 408 to OCS 410; the OCS then allocates five minutes for the call. At 412, a RequestReportBCSM with Continue is sent indicating the call can continue. At this point, charging begins and a time stamp 414 is recorded, prior to the answer at 416. At 418, an ApplyCharging_Continue message is sent. However, because the network switch charges from the answer, the parameters of this message are updated to include the time from call initiation, by subtracting the elapsed time from call initiation to answer. This has the effect of reducing the allocated time for the call by the amount of time taken to establish the call. Thus, if it took thirty seconds to setup the call, then the allocated time of five minutes will be reduced to four minutes thirty seconds. At 420, the call ends and the elapsed time of the call is reported 422 to OCS 410. However, because the network switch begins charging at answer, the time taken to setup the call needs to be added to the elapsed time for billing purposes. Thus, if the elapsed time of the call was two minutes thirty seconds, but it took thirty seconds to setup the call, then the reported elapsed time will be three minutes. At 424, the connection to subscriber A is closed.

Figure 4B:
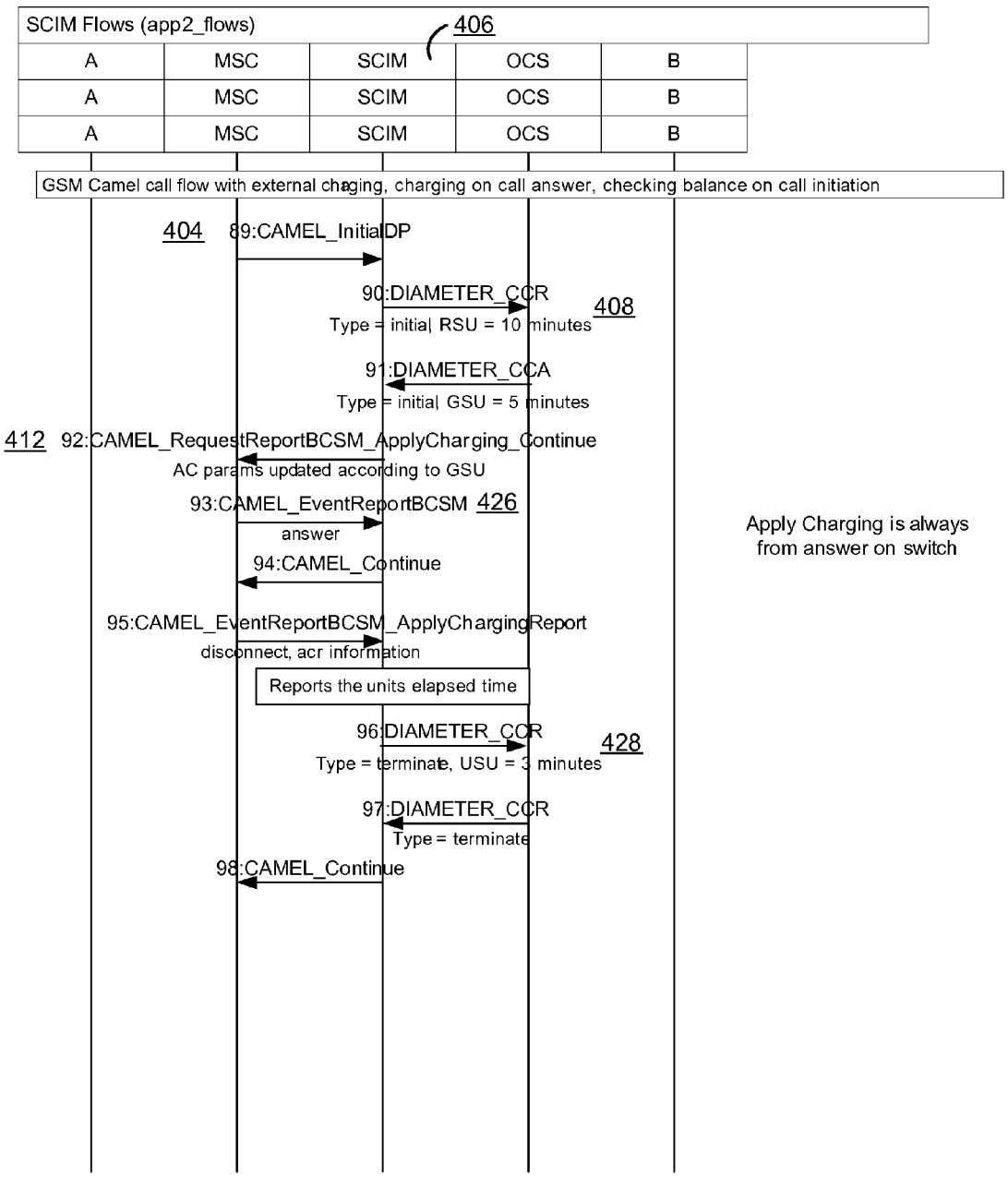

FIG. 4B shows a sequence diagram in which charging does not begin until subscriber B answers the call. In FIG. 4B, processing begins as in FIG. 4A with an InitialDP 404 sent to the SCIM 406 and a balance check 408. The call is initiated at 412, but charging does not begin until after the call is answered at 426. At 428, the call is disconnected and the elapsed time is reported to OCS 410. Because the network switch charges from call answer, no additional calculations are necessary.

Figure 4C:
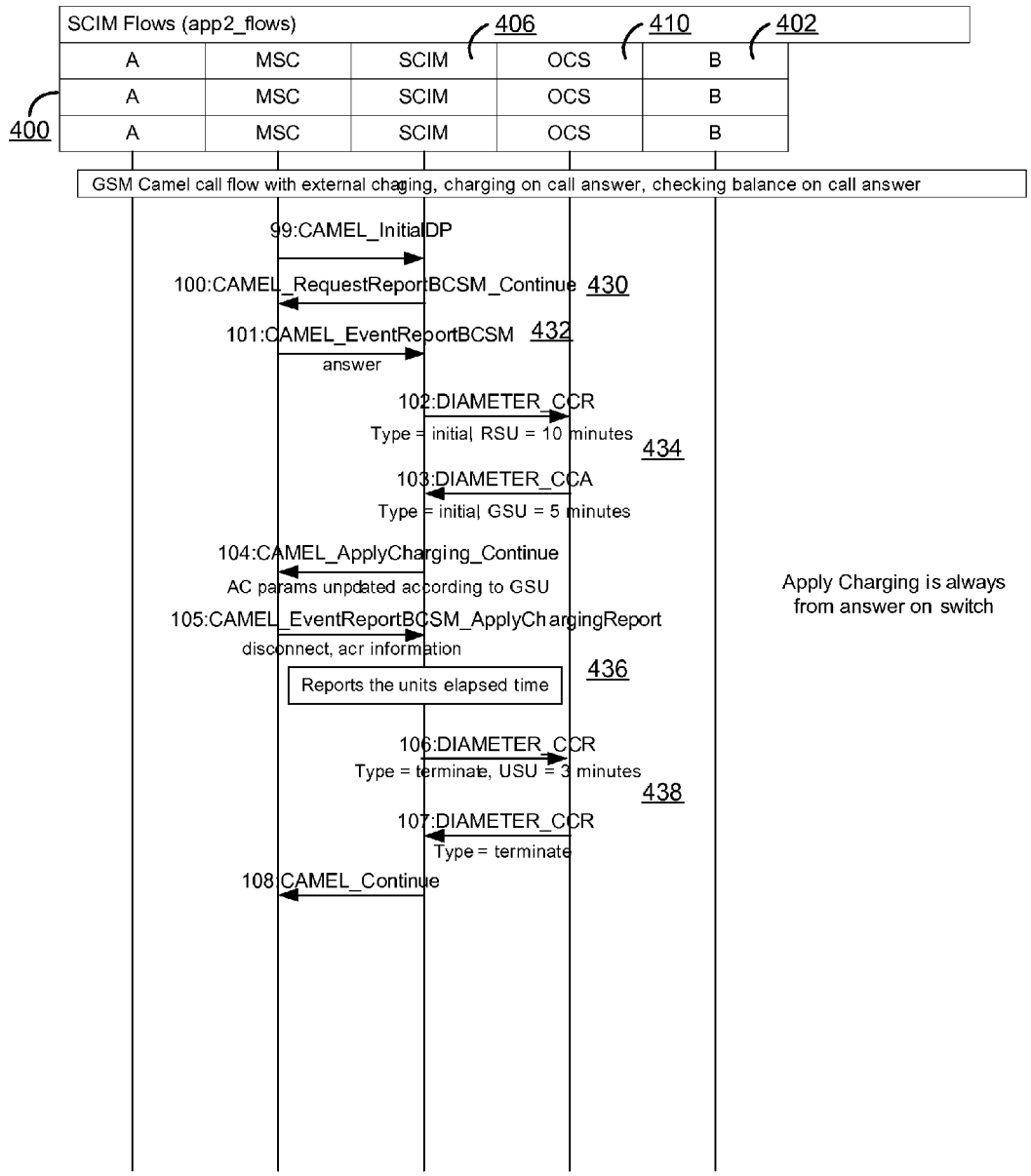

FIG. 4C shows a sequence diagram in which both check balance and charging occur when the call is answered. As shown in FIG. 4C, when subscriber A 400 calls subscriber B 402, an InitialDP 404 is sent to SCIM 406. The call is then initiated 430 with subscriber B without performing a balance check. After the call is answered 432, a balance check 434 is performed and charging begins. When the call ends 436, the elapsed time will be reported 438 and deducted from the subscriber's account. As before, because charging is handled externally by the network switch, no additional calculations are required.

Figure 4D:
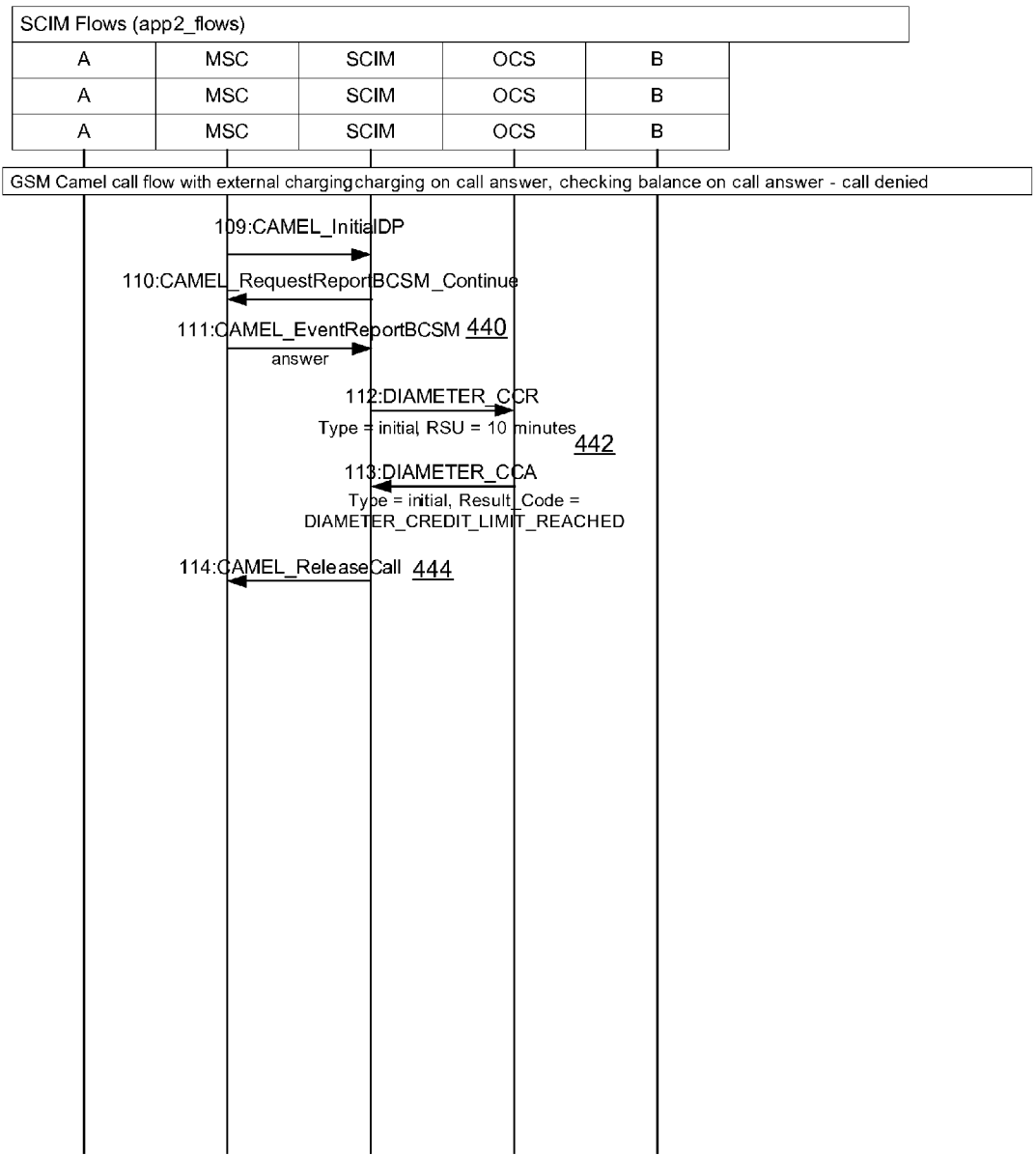

FIG. 4D shows a similar sequence diagram to FIG. 4C except the balance check fails. As shown in FIG. 4D, after the call is answered at 440, the balance check 442 indicates that the subscriber's credit limit has been reached. A ReleaseCall message 444 is then used to disconnect the call.

Figure 5:
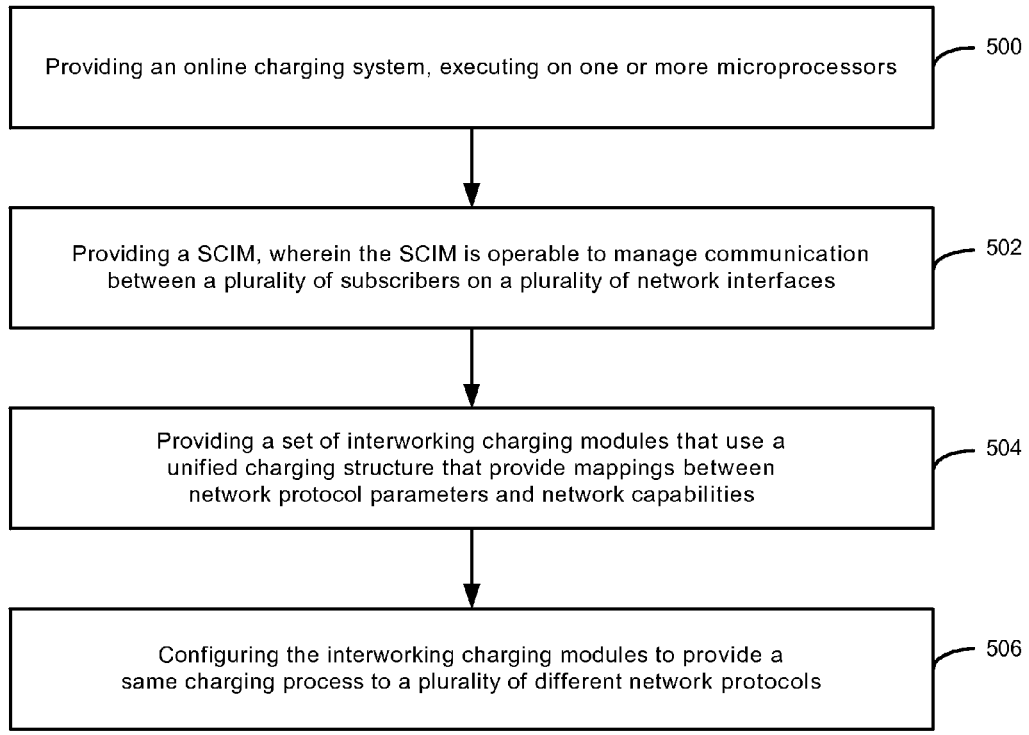
FIG. 5 shows a method of providing unified charging across different network interfaces, in accordance with an embodiment of the invention.

FIG. 5 shows a method of providing unified charging experience across different network interfaces, in accordance with an embodiment of the invention. At step 500, an online charging system, executing on one or more microprocessors, is provided. At step 502, a SCIM is provided which is operable to manage communication between a plurality of subscribers on a plurality of network interfaces. At step 504 a set of interworking charging modules are provided that use a unified charging structure these provide mappings between network protocol parameters and network capabilities. At step 506, the interworking charging modules are configured to provide a same charging behavior to a plurality of different network protocols.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing unified charging across different network interfaces, comprising:
an online charging system (OCS), executing on one or more microprocessors;
a SCIM, wherein the SCIM is operable to manage communication between a plurality of subscribers over a plurality of different network interfaces;
wherein the SCIM comprises a plurality of interworking charging modules (ICMs) that use a unified charging structure and are configured to provide a same charging behavior to a plurality of different network protocols;
said plurality of ICMs including a WIN ICM which, in response to communications from WIN network elements using WIN protocol, communicates charging requests to the OCS using Diameter protocol;
said plurality of ICMs including a SIP ICM which, in response to communications with SIP network elements using SIP, communicates charging requests to the OCS using Diameter protocol;
said plurality of ICMs including a CAP ICM which, in response to communications with CAP network elements using CAP protocol, communicates charging requests to the OCS using Diameter protocol.

2. The system of claim 1, wherein the online charging system further includes a plurality of different charging functions.

3. The system of claim 1, wherein the interworking charging modules can be configured to charge on initiation, charge on answer, check balance on initiation and check balance on answer, depending on the network protocol.

4. The system of claim 1, wherein when a call is made from a GSM network, if the interworking charging module is configured to charge on initiation, a timestamp is recorded when the call is initiated and the timestamp is used to calculate usage before the usage is reported to the online charging system.

5. The system of claim 4, wherein an allocated time is reduced based on a call setup time, wherein the call setup time is calculated by subtracting the timestamp from a current time when the call is answered.

6. The system of claim 5, wherein the usage is calculated as the call setup time plus an elapsed call time.

7. The system of claim 4, wherein the GSM network provides usage monitoring.

8. The system of claim 1, wherein when a call is made from a WIN network or a SIP network a timer is started according to charge on initiation or charge on answer.

9. A method for providing unified charging across different network interfaces, comprising:
providing an online charging system, executing on one or more microprocessors;
providing a SCIM, wherein the SCIM is operable to manage communication between a plurality of subscribers over a plurality of different network interfaces;
providing said SCIM with a plurality set of interworking charging modules (ICMs) are provided that use a unified charging structure configured to provide a same charging behavior to a plurality of different network protocols;
said plurality of ICMs including a WIN ICM which, in response to communications from WIN network elements using WIN protocol, communicates charging requests to the OCS using Diameter protocol;
said plurality of ICMs including a SIP ICM which, in response to communications with SIP network elements using SIP, communicates charging requests to the OCS using Diameter protocol; and
said plurality of ICMs including a CAP ICM which, in response to communications with CAP network elements using CAP protocol, communicates charging requests to the OCS using Diameter protocol.

10. The method of claim 9, wherein the online charging system further includes a plurality of different charging functions.

11. The method of claim 9, wherein the interworking charging modules can be configured to charge on initiation, charge on answer, check balance on initiation and check balance on answer, depending on the network protocol.

12. The method of claim 9, further comprising:
when a call is made from a GSM network, if the interworking charging module is configured to charge on initiation,
recording a timestamp when the call is initiated, and
using the timestamp to calculate usage before the usage is reported to the online charging system.

13. The method of claim 12, further comprising:
reducing an allocated time based on a call setup time, wherein the call setup time is calculated by subtracting the timestamp from a current time when the call is answered.

14. The method of claim 13, wherein the usage is calculated as the call setup time plus an elapsed call time.

15. The method of claim 12, wherein the GSM network provides usage monitoring.

16. The method of claim 9, wherein when a call is made from a WIN network or a SIP network a timer is started according to charge on initiation or charge on answer.

17. A non-transitory computer readable storage medium including instructions stored thereon which, when executed by a computer, cause the computer to perform steps comprising:
providing an online charging system, executing on one or more microprocessors;
providing a SCIM, wherein the SCIM is operable to manage communication between a plurality of subscribers over a plurality of different network interfaces;
providing said SCIM with a plurality set of interworking charging modules (ICMs) are provided that use a unified charging structure configured to provide a same charging behavior to a plurality of different network protocols;
said plurality of ICMs including a WIN ICM which, in response to communications from WIN network elements using WIN protocol, communicates charging requests to the OCS using Diameter protocol;
said plurality of ICMs including a SIP ICM which, in response to communications with SIP network elements using SIP, communicates charging requests to the OCS using Diameter protocol; and
said plurality of ICMs including a CAP ICM which, in response to communications with CAP network elements using CAP protocol, communicates charging requests to the OCS using Diameter protocol.

18. The non-transitory computer readable storage medium of claim 17, wherein the online charging system further includes a plurality of different charging functions.

19. The non-transitory computer readable storage medium of claim 17, wherein the interworking charging modules can be configured to charge on initiation, charge on answer, check balance on initiation and check balance on answer, depending on the network protocol.

20. The non-transitory computer readable storage medium of claim 17, further comprising:
   when a call is made from a GSM network, if the unified charging structure is configured to charge on initiation, recording a timestamp when the call is initiated, and using the timestamp to calculate usage before the usage is reported to the online charging system.

21. The non-transitory computer readable storage medium of claim 20, further comprising:
   reducing an allocated time based on a call setup time, wherein the call setup time is calculated by subtracting the timestamp from a current time when the call is answered.

22. The non-transitory computer readable storage medium of claim 21, wherein the usage is calculated as the call setup time plus an elapsed call time.

23. The non-transitory computer readable storage medium of claim 17, wherein when a call is made from a WIN network or a SIP network a timer is started according to charge on initiation or charge on answer.

* * * * *

UNITED STATES PATENT AND TRADEMARK OFFICE
CERTIFICATE OF CORRECTION

| | | |
|---|---|---|
| PATENT NO. | : 8,849,243 B2 | Page 1 of 1 |
| APPLICATION NO. | : 13/610625 | |
| DATED | : September 30, 2014 | |
| INVENTOR(S) | : Livne et al. | |

It is certified that error appears in the above-identified patent and that said Letters Patent is hereby corrected as shown below:

In the Specification

In column 3, line 20, delete "inteorking" and insert -- Interworking --, therefor.

In column 5, lines 25-26, delete "disconnect" and insert -- disconnect. --, therefor.

Signed and Sealed this
Twenty-eighth Day of April, 2015

Michelle K. Lee
*Director of the United States Patent and Trademark Office*